(12) United States Patent
Maeda et al.

(10) Patent No.: US 7,009,324 B2
(45) Date of Patent: *Mar. 7, 2006

(54) ROTOR OF ELECTRIC ROTATING MACHINE

(75) Inventors: Naohide Maeda, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/663,775

(22) Filed: Sep. 17, 2003

(65) Prior Publication Data

US 2004/0100162 A1 May 27, 2004

(30) Foreign Application Priority Data

Oct. 15, 2002 (JP) .............................. 2002-299875

(51) Int. Cl.
*H02K 1/22* (2006.01)
(52) U.S. Cl. ..................................................... 310/263
(58) Field of Classification Search ...............................
310/156.66–156.73, 263
See application file for complete search history.

(56) References Cited

U.S. PATENT DOCUMENTS 6,201,335 B1 * 3/2001 Higashino et al. ........... 310/263
6,307,297 B1 * 10/2001 Bramson et al. ............. 310/263
6,426,581 B1 * 7/2002 York et al. ................... 310/263

FOREIGN PATENT DOCUMENTS

JP 11-136913 5/1999
JP 2001-086715 3/2001

* cited by examiner

*Primary Examiner*—Tran Nguyen
(74) *Attorney, Agent, or Firm*—Sughrue Mion, PLLC

(57) ABSTRACT

Deformation and vibration of claw magnetic poles in rotor are reduced. A rotor includes: a rotor coil 15 for generating a magnetic flux by applying a current; a pole core comprised of a first pole core body 19 and a second pole core body 20 that are disposed so as to cover the rotor coil 15, each being provided with claw-shaped claw magnetic poles 21, 22 engaging with each other; and a magnet assembly 25 composed of a magnet 23 for reducing leakage of magnetic flux and a magnet-holding member 24 for supporting the magnet 23 on the claw magnetic poles 21, 22. Center of gravity 25G of the magnet assembly 25 is located on the base part side nearer than the center of the claw magnetic poles 21, 22.

5 Claims, 8 Drawing Sheets

[Fig 1]
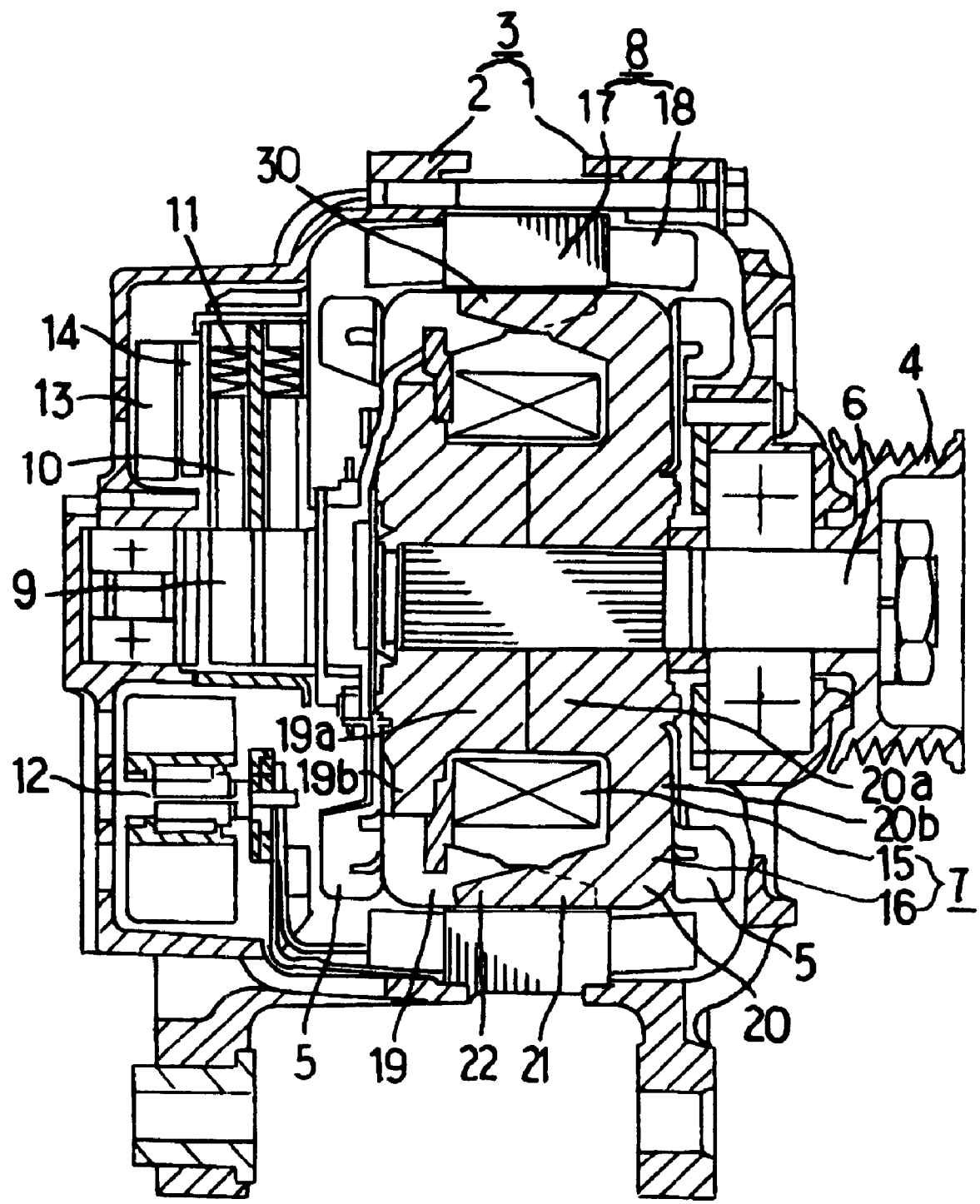

[Fig 2]
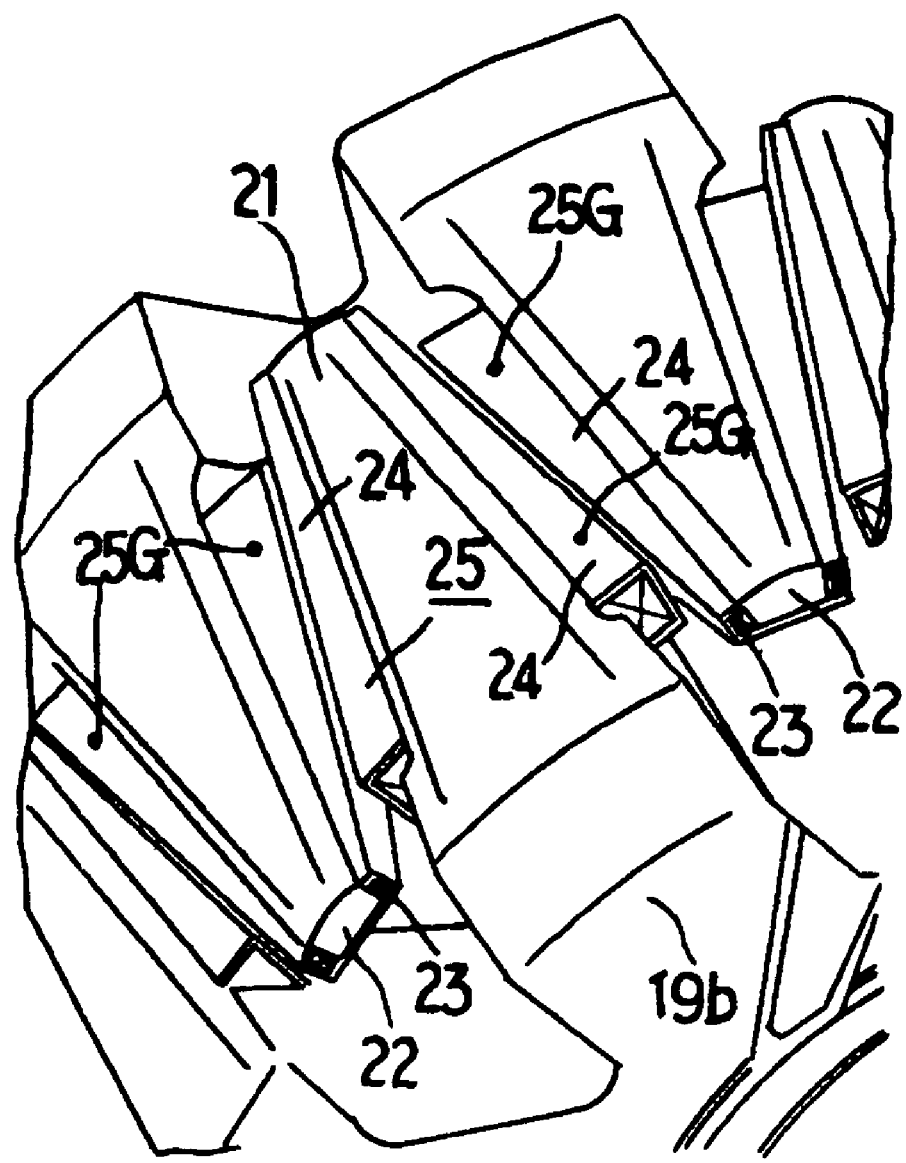

[Fig 3]
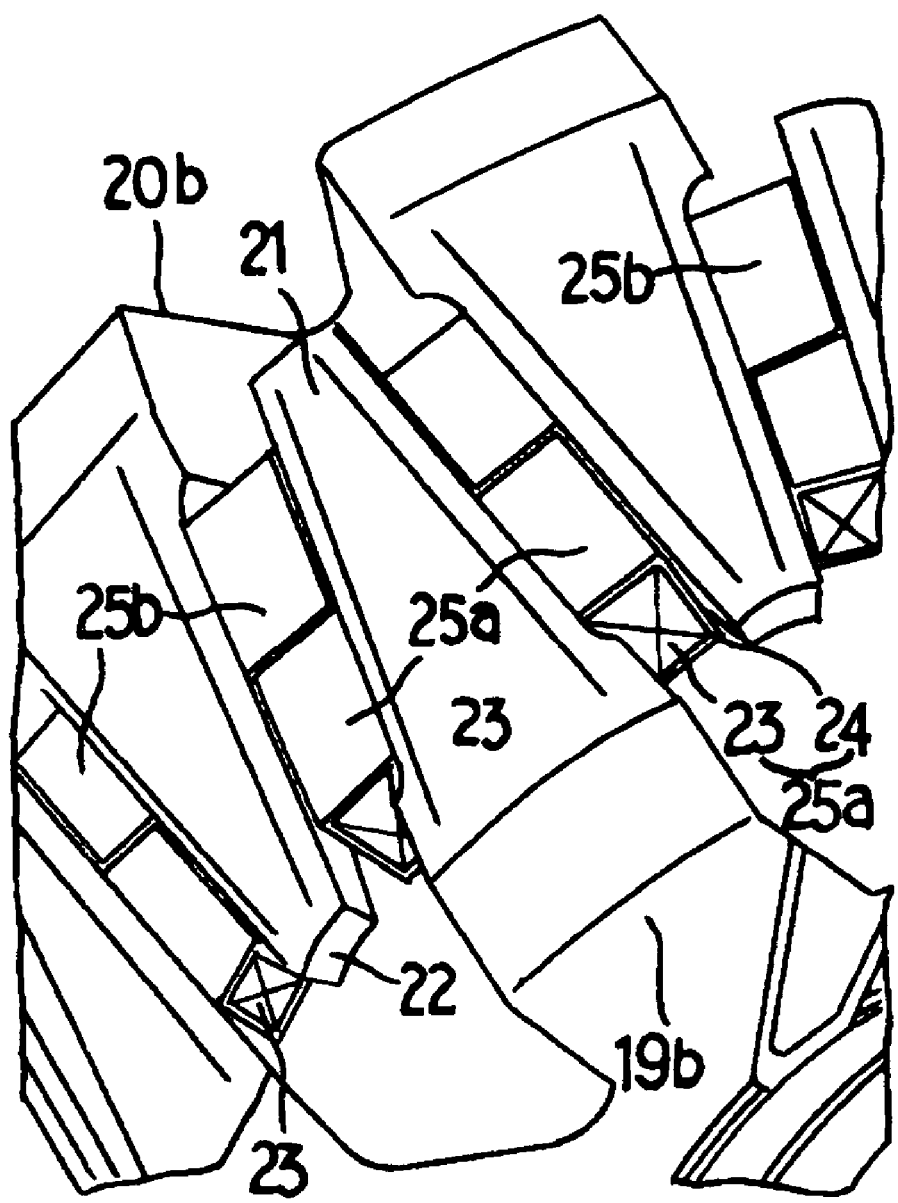

[Fig 4]
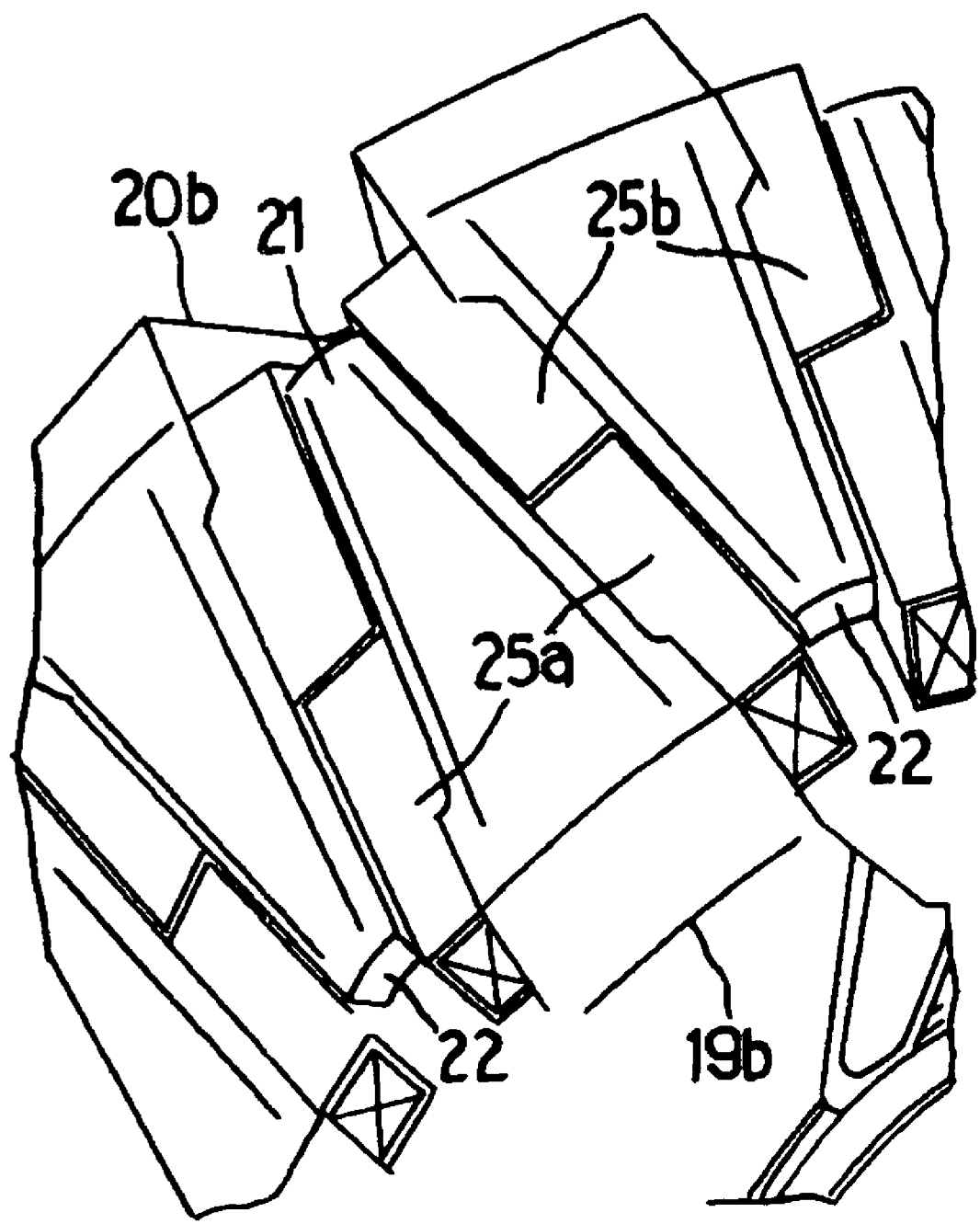

[Fig 5]
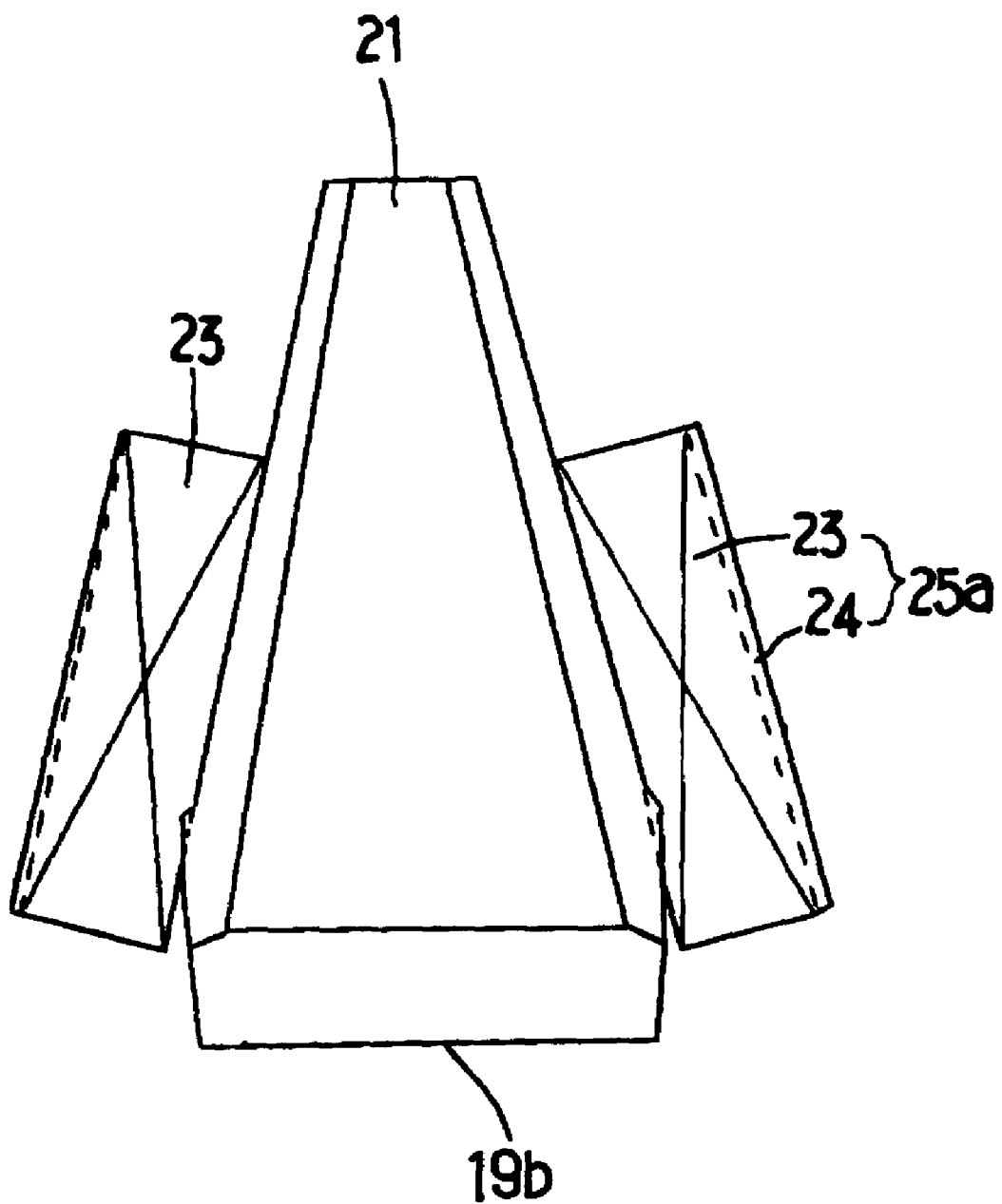

[Fig 6]
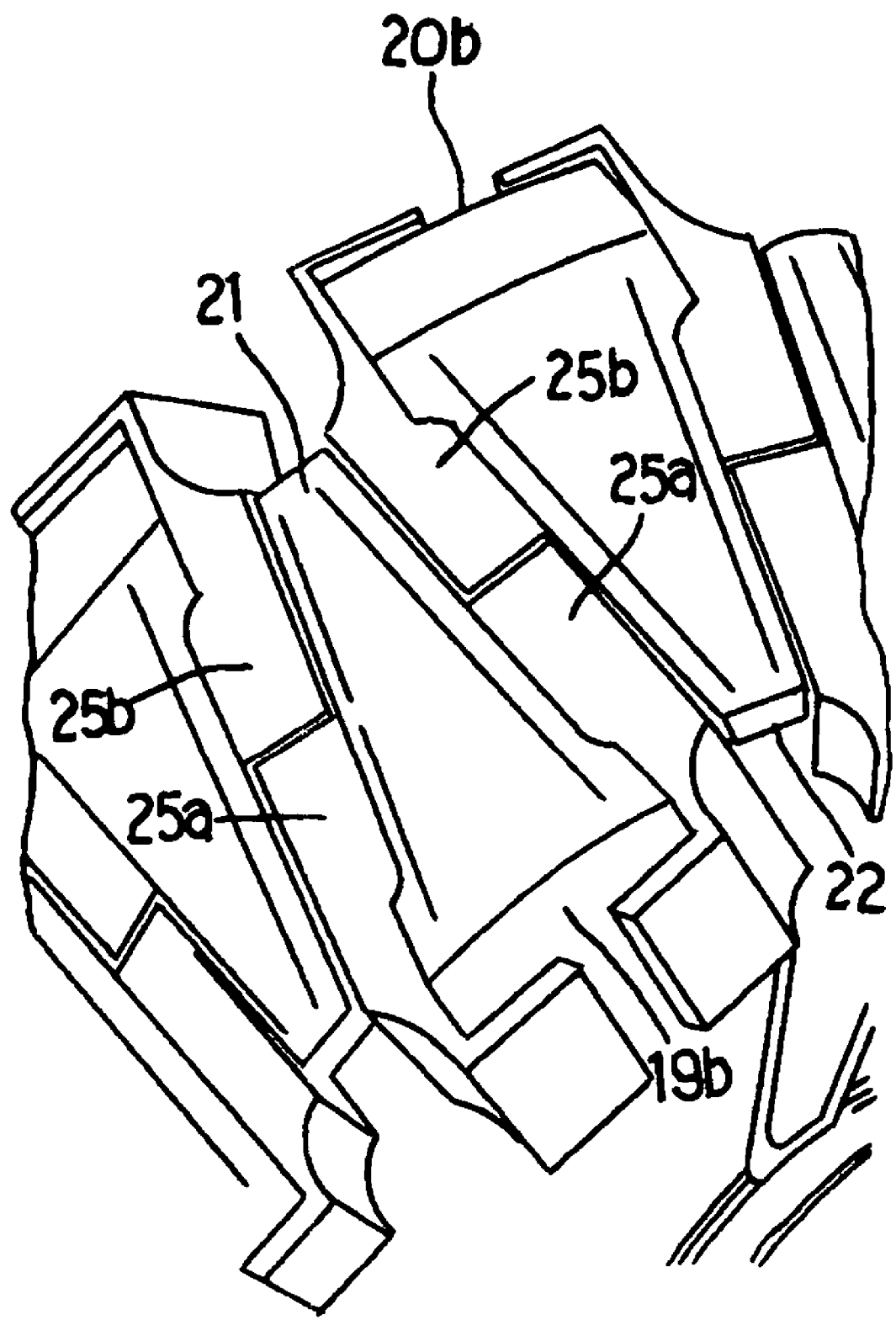

[Fig 7]
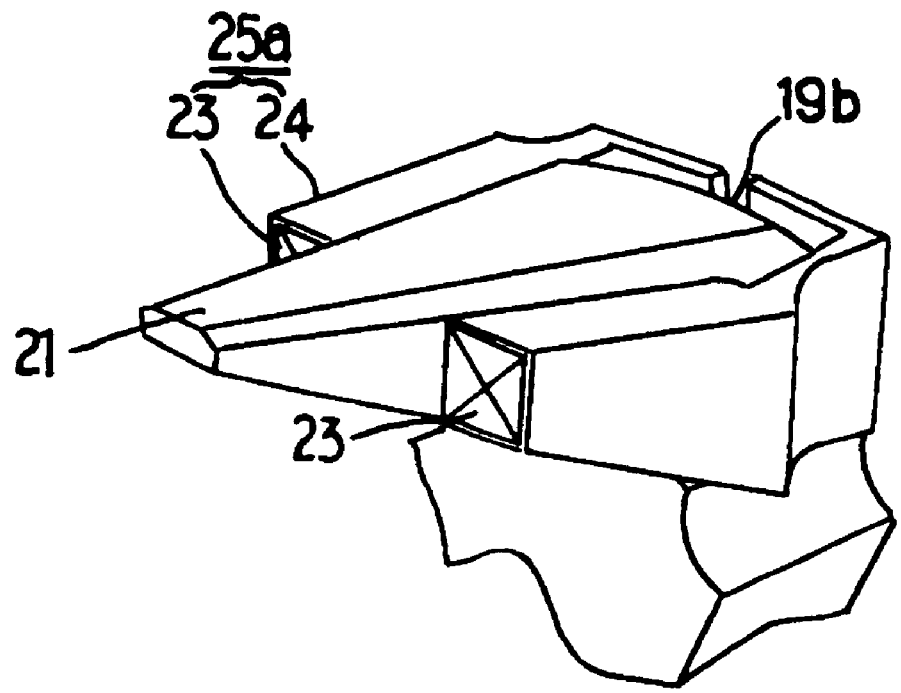
[Fig 8]
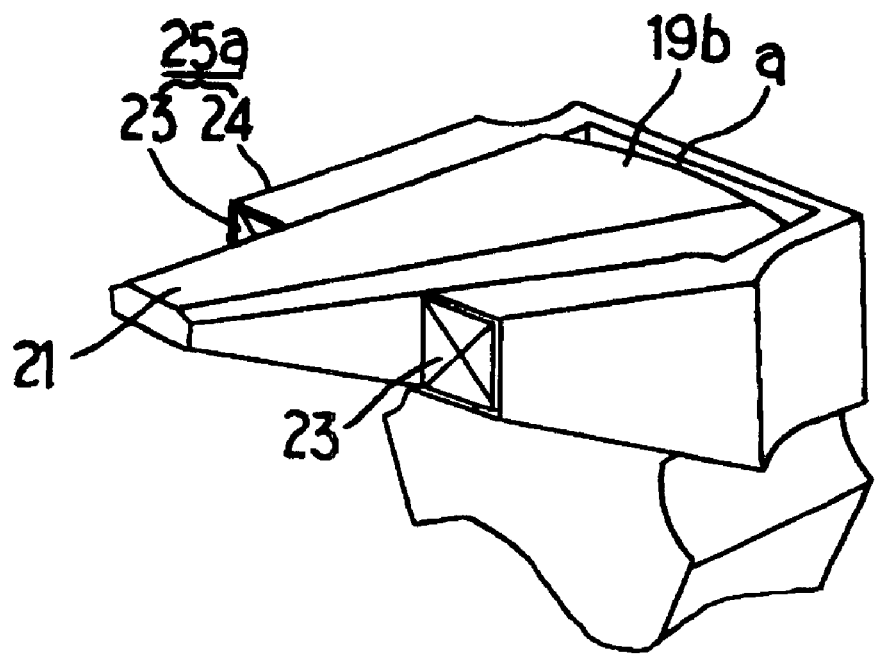

[Fig 9]
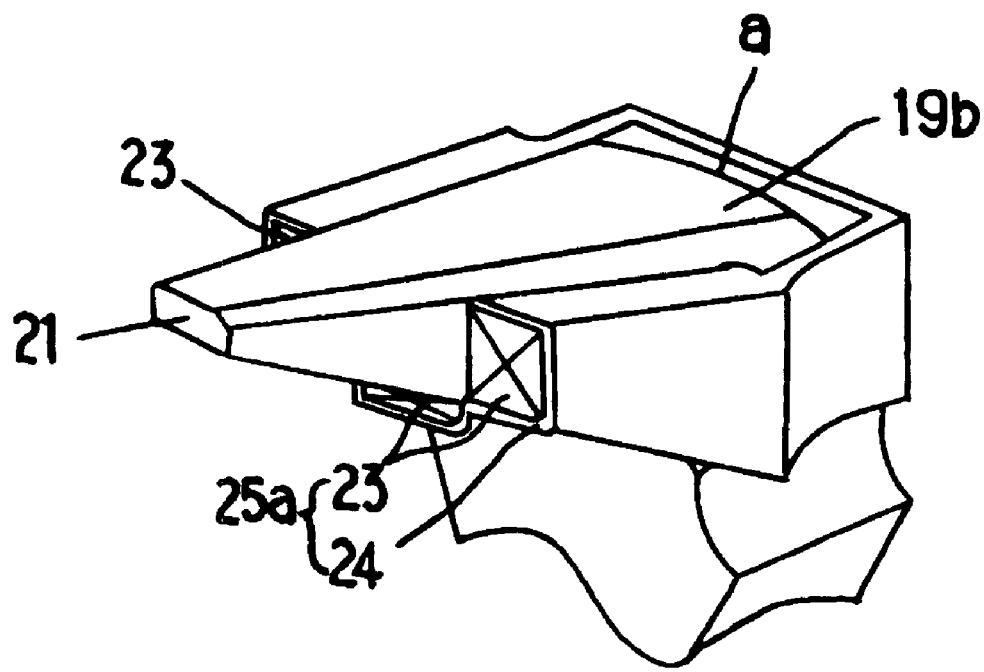
[Fig 10]
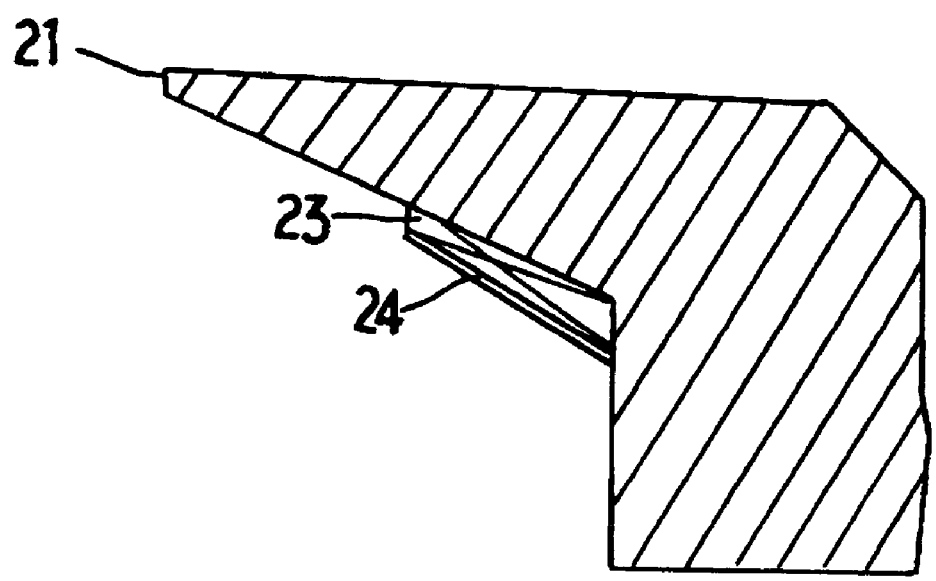

ROTOR OF ELECTRIC ROTATING MACHINE

BACKGROUND OF THE INVENTION

1. Field of the Invention

The present invention relates to a rotor structure of an electric rotating machine such as ac generator or electric motor and, more particularly, to a structure of fitting a magnet that prevents leakage of magnetic flux between claw magnetic poles.

2. Description of the Related Art

In a conventional rotor structure, rectangular parallelepiped magnets polarized in a direction of reducing leakage of magnetic flux between sides of adjacent claw magnetic poles are fixed between the claw magnetic poles facing each other, and holders for reducing centrifugal force are used to fit these magnets.

When the magnets for preventing leakage of magnetic flux are fitted to the claw magnetic poles of a rotor core as described above, the claw magnetic poles increase in weight. Therefore, end of each claw magnetic pole reciprocates toward a rotor coil and a stator due to centrifugal force caused by rotation of the rotor and magnetic attraction between the claw magnetic pole and the stator produced at the time of power generation.

As a result, a load is applied to the magnets between the claw poles, and this sometimes may cause distortion or breakage of the magnets.

To overcome this, in a conventional rotor, a magnet is fixed to each claw magnetic pole in such a manner as to cover an inner circumferential face and a side face of the claw magnetic pole.

In this known construction, spaces are left between the adjacent magnets.

As a result, the claw magnetic poles and the magnets reciprocate independently, therefore any load is not applied to the magnets, and it is possible to prevent the magnets from breakage (for example, see the Japanese Patent Publication (unexamined) No. 1999/136913, pages 3 and 4).

In another conventional rotor, each claw magnetic pole is provided with two ferrite magnets on both side faces of each claw pole, and these magnets are polarized so as to reduce leakage of magnetic flux between the claw magnetic poles.

These magnets are supported on the claw magnetic poles, with a slant so as to spread their outer circumference sides toward each other, by magnet-holding members for absorbing centrifugal force that acts on the mentioned magnets when the rotor is rotating through deformation of the magnet-holding members themselves. Thus, the magnets are so constructed as to withstand centrifugal force (for example, see the Japanese Patent Publication (unexamined) No. 2001/86715, page 6).

The permanent magnets are fitted to the claw magnetic poles for the purpose of reducing leakage of magnetic flux between the side faces of the adjacent claw magnetic poles and leakage of magnetic flux from their inside diameter faces, thereby improving output of the electric rotating machine.

However, fitting the magnets brings about a contrary effect, i.e., the claw magnetic pole as a whole increases in weight and the claw magnetic pole receives more centrifugal force caused by rotation of the rotor.

In particular, increase in weight of the end portion of the claw magnetic pole invites increase in deformation spreading toward a stator.

Hence, it is necessary to enlarge an air gap between the rotor and the stator in order to prevent breakage.

However, this air gap has a close relationship to the output, i.e., the more the air gap is decreased, the more output is increased.

Therefore, it is necessary that the magnets be fixed so as to restrain deformation of the claw magnetic poles from the viewpoint of further improving the output.

In the meanwhile, the magnet-holding members for fitting the magnets to the claw magnetic poles are influenced by the deformation of the claw magnetic poles and change in number of rotation of the rotor, and there is a possibility that the magnet-holding members or the magnets themselves are broken or get out of position due to vibration of the claw magnetic poles.

Moreover, the known structure of fitting the magnets to the claw magnetic poles also has a problem that it is not possible to efficiently assemble the rotor because interference in magnetic position occurs between the pole cores at the time of assembling rotor.

SUMMARY OF THE INVENTION

The present invention was made to solve the above-discussed problems and has an object of providing a rotor structure in which fitting structure of the magnets for preventing leakage of magnetic flux between the claw magnetic poles is designed so as to reduce centrifugal force caused by rotation of the rotor, reduce deformation and vibration of the claw magnetic poles, thus improving efficiency in assembling the rotor.

A rotor of an electric rotating machine according to claim 1 of the invention includes: a rotor coil for generating a magnetic flux by applying a current; and a pole core comprised of a first pole core body and a second pole core body that are disposed so as to cover the rotor coil, each being provided with claw-shaped claw magnetic poles engaging with each other. In the rotor, magnet assembly composed of a magnet for reducing leakage of magnetic flux and a magnet-holding member for supporting this magnet on the claw magnetic poles is arranged on the claw magnetic poles. Each magnet assembly is arranged so that center of gravity of thereof is located on the base part side at the portion nearer than the center of said magnetic claw poles.

As a result, deformation of the claw magnetic poles is reduced, and change in position due to vibration is also reduced, and therefore it is possible to prevent the magnet-holding members from breaking and prevent the magnet assembly from getting out, and the air gap between the rotor and the stator can be reduced. Consequently, it is possible to improve the output.

BRIEF DESCRIPTION OF THE DRAWINGS

FIG. 1 is a sectional side view showing an electric rotating machine according to Embodiment 1 of the present invention.

FIG. 2 is a perspective view showing a rotor portion according to Embodiment 1 of the invention.

FIG. 3 is a perspective view showing a rotor portion according to Embodiment 2 of the invention.

FIG. 4 is a perspective view showing a rotor portion according to Embodiment 3 of the invention.

FIG. 5 is a perspective view showing a claw magnetic pole portion.

FIG. 6 is a perspective view showing a rotor portion according to Embodiment 4 of the invention.

FIG. 7 is a perspective view showing a claw magnetic pole portion.

FIG. 8 is a perspective view showing a claw magnetic pole portion.

FIG. 9 is a perspective view showing a claw magnetic pole portion.

FIG. 10 is a sectional side view showing a claw magnetic pole portion.

DESCRIPTION OF THE PREFERRED EMBODIMENTS

Embodiment 1

FIG. 1 is a sectional side view showing an electric rotating machine in its entirety such as ac generator or an electric motor according to one embodiment of the present invention. Referring to the drawing, this electric rotating machine is provided with a housing 3 comprised of a front bracket 1 and a rear bracket 2 both made of aluminum, a shaft 6 disposed in this housing 3 and provided with a pulley 4 fixed onto an end thereof, a Randell-type rotor 7 fixed onto this shaft 6, fans 5 fixed onto both end faces of this rotor 7, a stator 8 fixed onto an inner wall face in the housing 3, a slip ring 9 that is fixed to the other end of the shaft 6 and supplies the rotor 7 with a current, a pair of brushes 10 sliding on this slip ring 9, a brush holder 11 in which these brushes 10 are accommodated, a rectifier 12 that is electrically connected to the stator 8 and rectifies an alternating current generated in the stator 8 into a direct current, a heat sink 13 fitted to the brush holder 11, and a regulator 14 adhering to this heat sink 13 and regulating the alternating voltage generated in the stator 8.

The rotor 7 is provided with a cylindrical rotor coil 15 for generating a magnetic flux by applying an electric current and a pole core 16 constructed so as to cover this rotor coil 15. Magnetic flux generated by the rotor coil 15 forms a magnetic pole in the pole core 16.

The stator 8 is provided with a stator core 17 and a stator coil 18 wound round this stator core 17, and in which alternating current is generated by change in magnetic flux from the rotor coil 15 with rotation of the rotor 7.

The pole core 16 is comprised of a first pole core body 19 and a second pole core body 20 engaging with each other and forming a pair.

The pole core body 19 and the pole core body 20 are normally composed of iron, each being comprised of a cylindrical part 19a, 20a round which the rotor coil 15 is wound and a disk-shaped base part 19b, 20b from which the cylindrical part 19a, 20a protrudes.

The outer edges of the base parts 19b, 20b are provided with plural claw magnetic poles 21, 22 engaging with each other between the outer circumference of the rotor coil 15 and the inner circumference of the stator 8 respectively.

Each claw magnetic pole 21, 22 is formed so as to be thick and wide on the base part 19b, 20b side while gradually decreasing in thickness and width (tapered) toward the end side.

Inner circumferential face of each claw magnetic pole 21, 22 gradually decreases in thickness toward the end thereof while outer circumferential face being arc-shaped extending along the inner circumferential face of the stator 8.

Each of claw magnetic poles 21, 22 has two trapezoidal side faces with respect to the circumferential direction of the rotor 7.

The claw magnetic poles 21 and 22 are engaged with each other with their ends opposite to each other, and therefore slants of the inner circumferential faces of the claw poles 21, 22 are alternately arranged in the circumferential direction.

Side faces of the claw magnetic poles 21, 22 gradually decrease in width from the base side to the end side and inclines toward the center of the claw poles 21, 22.

Now, operation of the rotor is hereinafter described.

A battery not shown in the drawing supplies an electric current to the rotor coil 15 through the brushes 10 and the slip ring 9 so as to generate a magnetic flux. Thus, the claw magnetic poles 21 of the first pole core body 19 are polarized with the N-pole, and the claw magnetic poles 22 of the second pole core body 20 are polarized with the S-pole.

On the other hand, the rotating force of engine drives the pulley 4, the shaft 6 rotates the rotor 7, and, as a result, an electromotive force is generated in the stator coil 18.

This alternating electromotive force is rectified into a direct current through the rectifier 12 and the regulator 14 regulates intensity thereof, whereby the battery is charged with the direct current.

On the other hand, it is possible to use the rotor as a motor by applying a voltage to the respective ac terminals.

FIG. 2 is a partially perspective view showing a rotor portion. In the drawing, each claw magnetic pole 21 is provided with two neodymium magnets 23, which are polarized so as to reduce leakage of magnetic flux between the magnetic claw magnetic poles 21 and 22, on both sides of each claw magnetic pole 21, and each claw magnetic pole 22 is provided with two neodymium magnets 23 on both sides of each claw magnetic pole 22.

These two magnets 23 are supported on the claw magnetic poles 21, 22 by magnet-holding members 24, and the magnets 23 and the magnet-holding members 24 form a magnet assembly 25.

The mentioned magnet-holding members 24 are respectively formed by bending a stainless steel (SUS304) plate of 0.5 mm in thickness, and are manufactured with ease.

Each magnet assembly 25 is trapezoidal plate-shaped so as to gradually increase in thickness toward the base side in the circumferential direction, and the magnet assembly 25 is so arranged that center of gravity 25G thereof is located on the base part side at the portion nearer than the center of the claw magnetic poles 21, 22.

Further, face of the magnet assembly 25 being in contact with the claw magnetic poles 21, 22 is also trapezoidal plate-shaped extending along the magnetic pole.

The magnet assembly 25 is fixed to the claw poles 21, 22 with an adhesive or the like.

Specifically, an adhesive or the like is applied between the inner circumferential face of the claw magnetic poles 21, 22 and the inner circumferential part of the magnet-holding member 24.

The claw magnetic poles 21, 22 and the magnet-holding member 24 are both made of metal, and therefore it is also preferable to fix the magnet-holding member 24 to the claw poles 21, 22 by welding.

By employing the configuration as described above, center of gravity 25G of the magnet assembly 25 is established on the base side of the claw magnetic poles 21, 22 of high rigidity, whereby the end side of the claw magnetic poles 21, 22 moving largely is reduced in weight.

When rotating the rotor 7 under the mentioned situation, the end part of the claw magnetic poles 21, 22 moving largely, receives centrifugal force less than in the conventional art, and the base part moving less comes to receive centrifugal force more.

The claw magnetic pole 21, 22 are cantilevered and supported on the base part, and therefore the centrifugal force on the end part is reduced. Thus it becomes possible to restrain movement of the end part and reduce air gap between the rotor 7 and the stator 8. As a result, output of the electric rotating machine is improved.

As described above, in the invention, center of gravity 25G of the magnet assembly 25 is located near the base side of the claw magnetic poles 21, 22, of which rigidity is high and deformation is small, and therefore it is possible to reduce not only deformation of the claw magnetic poles 21, 22 but also change due to vibration. As a result, it is possible to prevent the magnet-holding members 24 from breaking and prevent the magnet assembly 25 from getting out. Furthermore, the air gap between the rotor 7 and the stator 8 is reduced, and consequently it is possible to improve output.

Embodiment 2

In the foregoing Embodiment 1, the magnet assembly is constructed so as to cover the whole side of the claw magnetic poles and, furthermore, center of gravity is located near the base side. In this Embodiment 2, however, not only center of gravity of the magnet assembly but also the magnet assembly itself is disposed near the base side of the claw magnetic poles, thus the whole magnet assembly is located on the base side.

More particularly, as shown in FIG. 3, the claw magnetic pole 21 is provided with magnet assembly 25a only on both sides of the base part 19b, and the claw magnetic pole 22 is provided with magnet assembly 25b only on both sides of the base part 20b.

By employing the construction as described above, centrifugal force on the claw magnetic poles 21, 22 increases only on the base side, and therefore the end of the claw magnetic poles 21, 22 receives less centrifugal force and deformation thereof becomes small. The air gap between the rotor 7 and the stator 8 is further reduced as compared with the foregoing Embodiment 1, and therefore it is possible to increase output.

In the foregoing Embodiment 1, two magnet assemblies 25 are disposed between the adjacent claw magnetic poles 21, 22, and thickness of one magnet-holding member 24 is approximately equal to that of the two magnet assemblies. On the other hand, in this embodiment, only one magnet assembly is disposed between the claw poles 21, 22, thereby reducing thickness of the magnet-holding member 24 by half. As a result, it is possible to make the size of the neodymium magnet 23 large and effectively overcome the problem of leakage of magnetic flux from the side face.

Further, in case of assembling the rotor 7, since only one magnet assembly is disposed between the claw magnetic poles 21, 22 unlike the foregoing Embodiment 1, it is possible to assemble the rotor 7 without interference between the adjacent magnet assemblies, and assembling efficiency is improved.

As described above, since the magnet assembly 25 is constructed so that not only center of gravity but also its external shape is located near the base side of the claw magnetic poles 21, 22, the magnet assembly is mounted only on the base side, deformation in the ends of the claw magnetic poles 21, 22 is further reduced, and the magnets do not interfere with each other at the time of fitting.

Furthermore, since only one magnet-holding member 24 is disposed between the claw magnetic poles 21, 22, it is possible to make the size of the magnets 23 large and increase output.

Embodiment 3

FIG. 4 is a partially perspective view showing a rotor portion according to Embodiment 3 of the invention, and FIG. 5 is a perspective view showing a claw magnetic pole portion.

In this embodiment, the magnet-holding members extend to the base side along both side faces of the claw magnetic poles 21, 22. These extending portions are adhered to the claw magnetic poles 21, 22 with an adhesive agent or welded thereto.

By employing the construction as described above, the magnet assemblies are fixed more firmly than those of the foregoing Embodiments 1 and 2 and, furthermore, rotation of the claw magnetic poles 21, 22 in the circumferential direction is restrained.

Furthermore, it is possible to arrange the magnets 23 on the extending portions thereby further reducing leakage of magnetic flux.

As described above, according to this embodiment, since the magnet assemblies 25 extend to the base parts of the claw magnetic poles 21, 22, the claw magnetic poles 21, 22 do not rotate in the circumferential direction, and the magnet assemblies 25 are firmly fitted. Further, since the magnets 23 extend in axial direction, it is possible to further prevent leakage of magnetic flux, eventually increasing output.

Embodiment 4

FIG. 6 is a partially perspective view showing a rotor portion according to Embodiment 4 of the invention, and FIG. 7 is a perspective view showing a claw magnetic pole portion.

In this embodiment, the magnet-holding members 24 extend furthermore as compared with the foregoing Embodiment 3 up to the base parts 19b, 20b of the claw magnetic poles 21, 22 and are bent and fixed.

By employing the construction as described above, the same advantages as Embodiment 3 are obtained, and it is possible to prevent the magnet assemblies 25 from moving in axial direction because the fixed faces are located in axial direction.

Furthermore, since the portions where the magnet assemblies 25 are fixed to the claw magnetic poles 21 and 22 are located on the axial side, it is possible to fit the magnet assemblies 25 to the claw magnetic poles 21, 22 through elastic deformation of the magnet-holding members 24, thus assembling efficiency is improved.

As described above, according to this embodiment, extending the magnet-holding members 24 of the magnet assemblies 25 up to the backside of the pole, it is possible to restrain movement of the magnet assemblies 25 in axial direction, and the magnet assemblies 25 can be fitted and fixed with ease because fixing portions are located outside.

Embodiment 5

FIG. 8 is a partially perspective view showing a rotor portion according to Embodiment 5 of the invention. In this embodiment, the extending magnet-holding members 24 shown in Embodiment 4 extends further, and both end points "a" of them are joined and fixed by welding. Subsequently, the magnet-holding members 24 are fixed to the claw magnetic poles 21, 22 in the same manner as in the foregoing Embodiment 4.

By employing the construction as described above, the magnet-holding members 24 are improved in rigidity.

As described above, since the magnet-holding members 24 are joined and fixed onto the backside of the pole by welding, the magnet-holding members 24 increase in rigidity and are fixed more firmly.

Embodiment 6

FIG. 9 is a partially perspective view showing a rotor portion according to Embodiment 6 of the invention, and FIG. 10 is a sectional side view of the same portion.

In this embodiment, neodymium magnets 23 are added between the rotor coil 15 and the claw magnetic poles 21, 22 in order to reduce leakage of magnetic flux from the inner circumferential faces of the claw magnetic poles 21, 22 (reverse sides of the claw magnetic poles 21, 22).

By employing the construction as described above, output is further improved.

Since the magnets 23 are additionally fitted on the reverse side of the claw magnetic poles 21, 22, there is no more such problem as getting away the magnets 23 due to centrifugal force.

As described above, according to this embodiment, the magnets 23 are disposed for preventing leakage of magnetic flux between the adjacent claw magnetic poles 21, 22 of the pole core. Further the magnets 23 are additionally disposed for preventing leakage of magnetic flux from inside diameter sides of the claw magnetic poles 21, 22, and the magnetic assemblies 25 having the magnet-holding members 24 for fixing these magnets 23 to the claw magnetic poles 21 and 22 are disposed. As a result, it is possible to reduce leakage of magnetic flux and improve output.

The output can be further improved effectively by combining the construction of this embodiment with those described in the foregoing Embodiments 1 to 5.

Although the foregoing Embodiments 1 to 6 disclose a rotor structure in which type a field coil is incorporated in the rotor and rotates along with the claw magnetic poles, and a field current is supplied to the field coil through brushes, the invention is also applicable to a brushless-type generator in which a field coil is fixed to a bracket and a rotating field is supplied from air gap.

What is claimed is:

1. A rotor of an electric rotating machine comprising:
   a rotor coil for generating a magnetic flux by applying a current;
   a pole core comprising a first pole core body and a second pole core body that are disposed so as to cover the rotor coil, each being provided with a claw-shaped magnetic poles interdigitated with each other; and
   a magnet assembly comprising magnets for reducing leakage of magnetic flux and a magnet-holding member for supporting said magnets on respective claw magnetic poles,
   wherein the magnets are arranged on both sides of said respective claw magnetic poles, and are formed as trapezoidal plates which gradually increase in both width and thickness toward a base side of the claw magnetic pole, such that said magnet's center of gravity is located closer to the base of said claw magnetic pole than an axial center of said claw magnetic pole.

2. The rotor of an electric rotating machine according to claim 1, wherein said magnet assembly extends to the base part of said respective claw magnetic pole.

3. The rotor of an electric rotating machine according to claim 1, wherein said magnet-holding member extends to a backside of the respective claw magnetic pole and is fitted to said respective claw magnetic pole.

4. The rotor of an electric rotating machine according to claim 1, wherein said magnet-holding member extends to a backside of the respective claw magnetic pole and is fitted to said respective claw magnetic pole, and extending parts of said magnet-holding member are joined together on said backside of the respective claw magnetic pole.

5. The rotor of an electric rotating machine according to claim 1, wherein a further magnet for reducing leakage of magnetic flux is arranged on an inner radial side of said respective claw magnetic pole.

* * * * *